United States Patent
Brown et al.

(10) Patent No.: US 8,423,803 B2
(45) Date of Patent: Apr. 16, 2013

(54) METHOD AND SYSTEM FOR FORCING ONE OR MORE POWER STATES ON A DISPLAY

(75) Inventors: Andrew Brown, Houston, TX (US); Alan M. Green, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 12/937,677

(22) PCT Filed: Apr. 23, 2008

(86) PCT No.: PCT/US2008/061286
§ 371 (c)(1),
(2), (4) Date: Oct. 13, 2010

(87) PCT Pub. No.: WO2009/131577
PCT Pub. Date: Oct. 29, 2009

(65) Prior Publication Data
US 2011/0035609 A1    Feb. 10, 2011

(51) Int. Cl.
*G06F 1/00*    (2006.01)
*G06F 3/038*    (2006.01)
*H04B 1/10*    (2006.01)

(52) U.S. Cl.
USPC .................... 713/300; 345/211; 455/300

(58) Field of Classification Search .............. 713/300; 345/211; 455/300
See application file for complete search history.

(56) References Cited

U.S. PATENT DOCUMENTS

| 5,886,689 | A | 3/1999 | Chee et al. |
| 5,983,014 | A * | 11/1999 | Shay ............................ 702/60 |
| 6,404,423 | B1 * | 6/2002 | Kivela et al. ................ 345/212 |
| 7,899,434 | B2 * | 3/2011 | Cohen et al. .............. 455/343.1 |
| RE43,202 | E * | 2/2012 | Yoo ............................ 345/211 |
| 2002/0079872 | A1 | 6/2002 | Kim |
| 2004/0246198 | A1 * | 12/2004 | Sahashi ........................ 345/3.1 |
| 2011/0202778 | A1 * | 8/2011 | Zmudzinski et al. ......... 713/300 |
| 2012/0023339 | A1 * | 1/2012 | Chueh et al. ................ 713/300 |

FOREIGN PATENT DOCUMENTS

| EP | 1199697 | 4/2002 |
| JP | 2000-075964 | 3/2000 |
| KR | 10-1998-0036412 | 8/1998 |

OTHER PUBLICATIONS

International Search Report and Written Opinion, dated Jan. 16, 2009, 11 pages.
Extended European Search Report dated Apr. 11, 2011, issued in European Patent Application No. 08746667.

* cited by examiner

*Primary Examiner* — Paul R Myers
*Assistant Examiner* — Christopher A Daley

(57) ABSTRACT

A management controller, method and program product for forcing one or more power states on a display, the management controller comprising: a computer (110) configured to receive a power management electronic signal; the computer (110) comprising control logic that operates without use of an operating system to determine a desired level of the power management electronic signal and to set the power management electronic signal to the desired level; and the computer (110) configured to send the power management electronic signal at the desired level to a monitor (120).

17 Claims, 2 Drawing Sheets

METHOD AND SYSTEM FOR FORCING ONE OR MORE POWER STATES ON A DISPLAY

BACKGROUND OF THE INVENTION

Current display power management signaling (DPMS) features for a monitor are only supported in the operating system (OS), e.g., screen savers. There are no known solutions for forcing DPMS monitor power states for power savings, security, or other reasons, other than through the operating system via a signal from a video controller.

SUMMARY OF THE INVENTION

In one embodiment a method is disclosed for forcing one or more power states on a display, comprising: receiving a power management electronic signal; executing control logic in a computer without use of an operating system to determine a desired level of the power management electronic signal; setting the power management electronic signal to the desired level; and sending the power management electronic signal at the desired level to a monitor.

In a further embodiment, a management controller is disclosed for forcing one or more power states on a display, comprising: a computer configured to receive a power management electronic signal; the computer comprising control logic that operates without use of an operating system to determine a desired level of the power management electronic signal and to set the power management electronic signal to the desired level; and the computer configured to send the power management electronic signal at the desired level to a monitor.

In a yet further embodiment, a management controller is disclosed for forcing one or more power states on a display, comprising: means for receiving a power management electronic signal; means for executing control logic in a computer without use of an operating system to determine a desired level of the power management electronic signal; means for setting the power management electronic signal to the desired level; and means for sending the power management electronic signal at the desired level to a monitor.

DETAILED DESCRIPTION OF THE PREFERRED EMBODIMENTS

Figure 1:
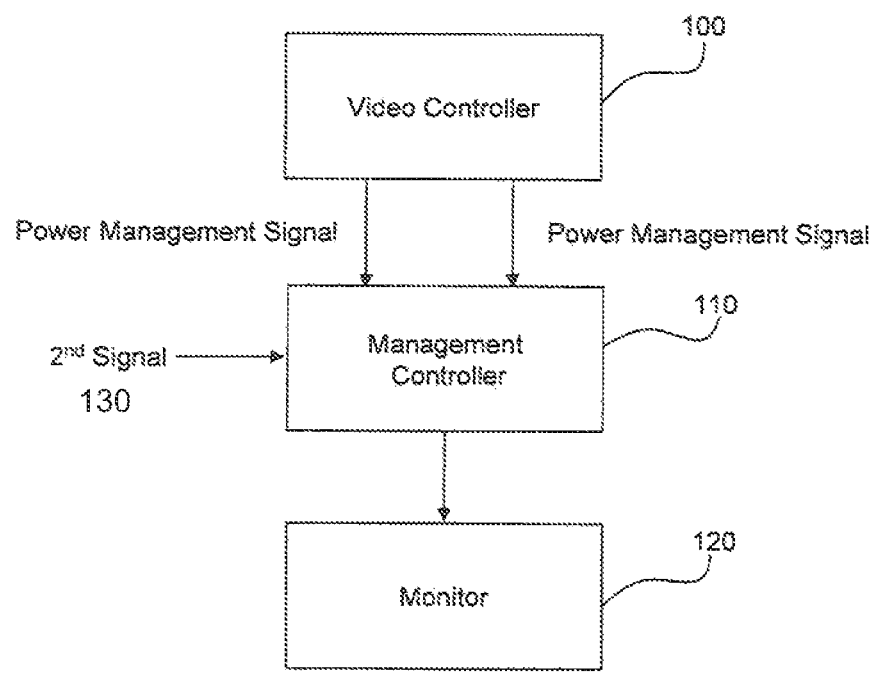
FIG. 1 is a schematic block diagram of an embodiment of the invention.

The invention is described below with reference to drawings. These drawings illustrate certain details of specific embodiments that implement the systems and methods of the present invention. However, describing the invention with drawings should not be construed as imposing, on the invention, any limitations that may be present in the drawings. The present invention contemplates both methods and systems. The embodiments of the present invention may comprise a special purpose or general-purpose computer including various computer hardware.

An exemplary system for implementing the portions of the invention includes a general purpose-computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a DVD-ROM, CD-ROM or other optical media. The drives and their associated computer-readable media provide nonvolatile storage of computer-executable instructions, data structures, program modules and other data for the computer.

The invention in one embodiment will be described in the general context of computer-executable instructions, such as program modules, being executed by a computer. Such program code or software means may be stored on the hard disk, magnetic disk, optical disk, ROM or RAM, and may include other program modules, and program data.

Embodiments within the scope of the present invention also include computer-readable media for carrying or having computer-executable instructions or data structures stored thereon and also known as software. Such computer-readable media can be any available media, which can be accessed by a general purpose or special purpose computer. By way of example, and not limitation, such computer-readable media can comprise RAM, ROM, EPROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions. Computer-executable instructions may also be properly termed "software" as known by those of skill in the art.

Referring now to FIG. 1, the invention comprises in one embodiment adding structure and/or firmware in the form of a management controller 110 into a system to selectively disable the power management signals from a video controller 100 and generate a new signal at a desired level for application to a monitor 120. In one embodiment for VGA systems, the power management signals may comprise HSYNC and VSYNC signals being sent to the monitor 120 to place the monitor in Standby, Suspend or Off modes. In another embodiment for HDMI systems, the power management signals may comprise HDMI control signals.

In an embodiment, management controller 110 may comprise a computer comprising control logic that operates without use of an operating system to determine a desired level of the power management electronic signal and to set the power management electronic signal to the desired level. The computer would further be configured to send the power management electronic signal at the desired level to a monitor.

In a further embodiment, the management controller 110 could be implemented by replacing OR buffers used to boost the HSYNC and VSYNC signals in a system (one input to the OR buffer is a power management electronic signal from the video controller and the other signal into the OR buffer is tied to 'low'), to an AND buffer. The HSYNC and VSYNC signals are connected (from the video controller 100) to one input of the AND buffer. A 2nd input 130 to the AND buffer would be a control signal driven from the system of the invention, but not from the operating system. This $2^{nd}$ signal would force the power management electronic signal 'low' in order to disable one or more of these signals selectively to force the various DPMS states. In one embodiment, the $2^{nd}$ signal could be a serial-out scan chain signal. In another embodiment, the $2^{nd}$ signal could be an indicator that the operating system has locked up. In another embodiment, the $2^{nd}$ signal could indicate that power has been lost by one or more components in the system. In a further embodiment, the $2^{nd}$ signal could be an external control signal to reduce power in components such as monitors due to a critical power shortage to thereby maintain one or more servers running. In yet a further embodiment, the $2^{nd}$ signal could be an external control signal that could control one or more monitors to enforce video security during various remote management sessions. A default for the $2^{nd}$ signal would be 'high' to allow the power management electronic signals from the video controller 100 to pass through to the monitor. When desired, the signal could be brought 'low' in order to disable the signals selectively to force the various DPMS states. The choice of whether to place the monitor in Standby, Suspend or Off mode by controlling one or more of the power management electronic signals would be a design choice.

Accordingly, in one embodiment, the computer in the management controller 110 would comprise a network connection configured to receive an external control signal, and control the desired level of the power management electronic signal based on this external control signal.

In a further embodiment, the computer in the management controller 110 would be configured with privilege level logic for determining a privilege level for the external control signal or a sender of the external control signal, and to control the desired level of the power management electronic signal based on the external control signal only lithe privilege level is at or above a predetermined level.

In a yet further embodiment, the computer in the management controller 110 would be configured to receive a lock up signal indicating that the operating system has locked up, and be further configured with control logic to determine the desired level of the power management electronic signal based on the lock up signal. For example, if the OS has locked up, then the monitor could be placed in the Standby mode.

In a yet further embodiment, the computer in the management controller 110 would be configured to receive a control signal indicating that a power failure has occurred, and be further configured with control logic to determine the desired level of the power management electronic signal based on the control signal. For example, if there has been a power failure, then the monitor could be placed in the Off mode. In one implementation of this embodiment, a selection of the mode for the monitor, e.g., Suspend, Standby, Off, would be made based on the level of a power shortage or failure.

In a yet further embodiment, the computer in the management controller 110 would be configured to send the power management electronic signal at the desired level to a plurality of monitors. In one implementation of this embodiment, the power management electronic signals from a plurality of different video controllers would be routed to a single management controller 110.

In a yet further embodiment, the computer in the management controller 110 would be configured to select based on a criterion a number of monitors to control the power management electronic signal to the desired level. For example, the criterion could be a level of power shortage for an overall system. Logic may be included to increase the number of monitors forced to a Standby or an Off mode based on the level of the power shortage.

Figure 2:
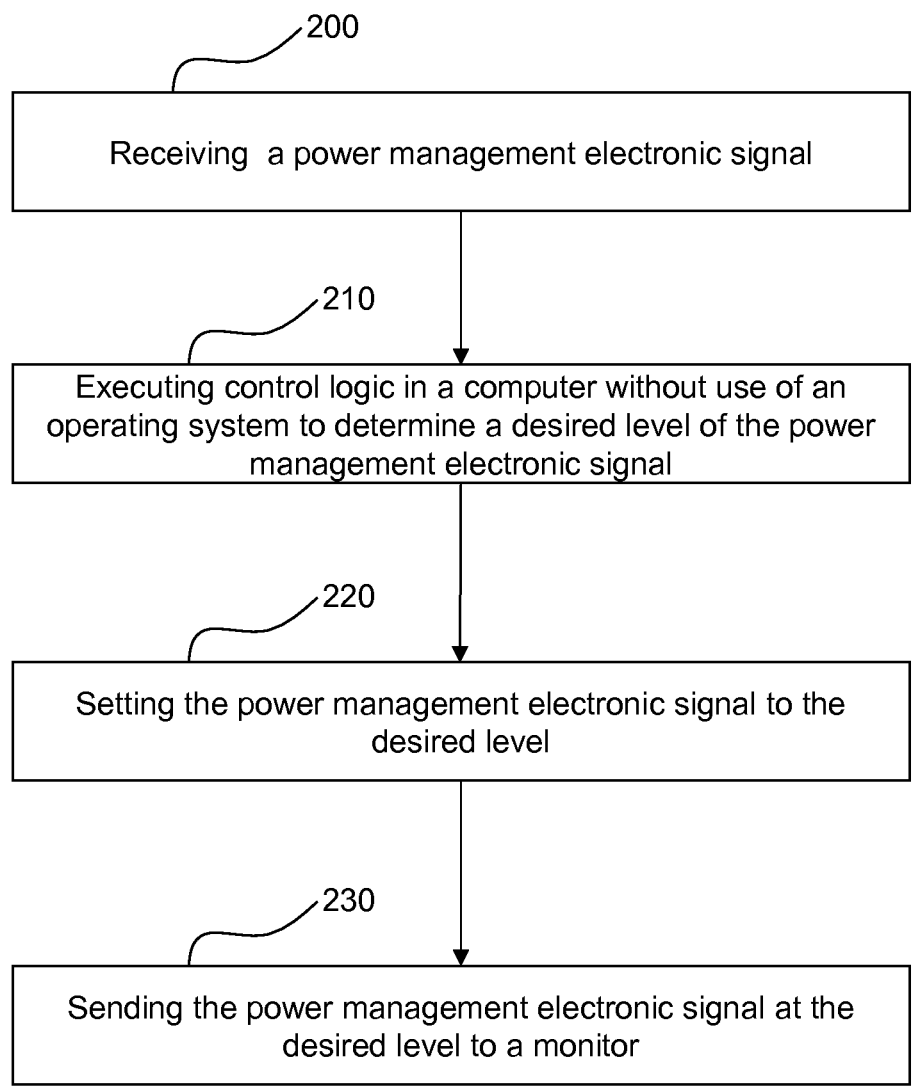
FIG. 2 is a block diagram of a flowchart illustrating a method of the invention.

Referring to FIG. 2, a flowchart for a method for forcing one or more power states on a display is disclosed. Block 200 comprises an operation of receiving a power management electronic signal. Block 210 comprises an operation of executing control logic in a computer without use of an operating system to determine a desired level of the power management electronic signal.

Block 220 comprises an operation of setting the power management electronic signal to the desired level. Block 230 comprises an operation of sending the power management electronic signal at the desired level to a monitor.

In a further embodiment, the method may comprise operations of receiving an external control signal 130 on a line from a network, and controlling the desired level of the power management electronic signal based on the external control signal.

In a yet further embodiment, the method may comprise operations of determining a privilege level for the control signal or a sender of the external control signal, and controlling the desired level of the power management electronic signal based on the external control signal only if the privilege level is at or above a predetermined level.

In a further embodiment, the method may comprise operations of receiving a lock up signal indicating that the operating system has locked up, and controlling the desired level of the power management electronic signal based on the lock up signal.

In a yet further embodiment, the method may comprise operations of receiving a failure signal indicating that a power failure has occurred, and controlling the desired level of the power management electronic signal based on the failure signal.

In a further embodiment, the method may comprise an operation of sending the power management electronic signal at the desired level to a plurality of monitors. In one implementation of this embodiment, the number of monitors to which the power management electronic signal at the desired level is sent may be based on a criterion. For example, the criterion may be a level of a power shortage.

Accordingly, in one embodiment, an ability has been provided to force DPMS power states of monitors regardless of OS support. Thus, this power state control can be enforced independent of the main server network connection. In another embodiment, an ability has been provided to force DPMS power states in response to emergency or other critical power shortages (e.g., to maintain servers running). In a yet further embodiment, an ability has been provided to force DPMS power states of monitors to enforce video security during various remote management sessions. Thus, it may be desired to blank local monitors during a remote session by a manager.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or manual operations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for forcing one or more power states on a display, comprising:
   receiving (200) a power management electronic signal;
   receiving a lock up signal indicating whether an operating system has locked up;
   executing control logic (210) in a computer without use of the operating system to determine a desired level of the power management electronic signal based on the lock up signal;
   setting (220) the power management electronic signal to the desired level; and
   sending (230) the power management electronic signal at the desired level to a monitor.

2. The method as defined in claim 1, wherein the power management electronic signal comprises at least one of a VSYNC and an HSYNC electronic signal.

3. The method as defined in claim 1, wherein the power management electronic signal comprises an HDMI electronic signal.

4. The method as defined in claim 1, further comprising sending the power management electronic signal at the desired level to a plurality of monitors.

5. The method as defined in claim 4, further comprising selecting a number of monitors to which to send the power management electronic signal at the desired level based on a criterion.

6. The method as defined in claim 5, wherein the criterion is a level of power shortage.

7. A management controller for forcing one or more power states on a display, comprising:
   a computer (110) configured to receive a power management electronic signal;
   the computer configured to receive a control signal indicating whether a power failure has occurred;
   the computer (110) comprising control logic to operate without use of an operating system to determine a desired level of the power management electronic signal based on the control signal and to set the power management electronic signal to the desired level; and
   the computer (110) configured to send the power management so electronic signal at the desired level to a monitor (120).

8. The system as defined in claim 7, wherein the computer is further configured to send the power management electronic signal at the desired level to a plurality of monitors.

9. The system as defined in claim 8, wherein the computer is further configured to select a number of monitors to which to send the power management electronic signal at the desired level based on a criterion.

10. The system as defined in claim 9, wherein the criterion is a level of power shortage.

11. The system as defined in claim 7, wherein the power management electronic signal comprises at least one of a VSYNC and an HSYNC electronic signal.

12. A non-transitory computer-readable storage medium encoded with instructions executable by a processing unit of a computing device, the storage medium comprising instructions to:
   receive a power management electronic signal;
   receive an external control signal from a network;
   determine a privilege level for the control signal;
   determine, without use of an operating system, a desired level of the power management electronic signal based on the external control signal if the privilege level is at or above a predetermined level; and
   send the power management electronic signal at the desired level to a monitor.

13. The storage medium of claim 12, further comprising instructions to:
   set the power management electronic signal to the desired level.

14. The storage medium of claim 12, wherein the power management electronic signal comprises at least one of a VSYNC and an HSYNC electronic signal.

15. The storage medium of claim 12, wherein the power management electronic signal comprises an HDMI electronic signal.

16. The storage medium of claim 12, further comprising instructions to:
   select a number of monitors to which to send the power management electronic signal at the desired level based on a level of power shortage.

17. The storage medium of claim 16, wherein the instructions to send comprise instructions to:
   send the power management electronic signal at the desired level to a plurality of monitors, wherein the plurality of monitors has the selected number of monitors.

* * * * *